United States Patent [19]

Madan

[11] 4,026,532
[45] May 31, 1977

[54] MIXER LOCKING STRUCTURE

[75] Inventor: Bhim S. Madan, Brockport, N.Y.

[73] Assignee: General Electric Company, Bridgeport, Conn.

[22] Filed: May 14, 1976

[21] Appl. No.: 686,453

[52] U.S. Cl. .......................... 259/104; 259/DIG. 35
[51] Int. Cl.² ............................................ B01F 7/00
[58] Field of Search ............. 259/104, 84, 85, 102, 259/108, DIG. 35

[56] References Cited

UNITED STATES PATENTS

| 1,902,678 | 3/1933 | Theodoropulos | 259/104 |
| 1,926,910 | 9/1933 | Lynch | 259/84 |
| 1,984,619 | 12/1934 | Wright | 259/104 |
| 1,988,244 | 1/1935 | Johnston | 259/84 |

*Primary Examiner*—Edward J. McCarthy
*Attorney, Agent, or Firm*—John F. Cullen; George R. Powers; Leonard J. Platt

[57] ABSTRACT

A household electric, stand food mixer with a motor in a housing, a handle and removable beaters at one end, a bowl supporting base with a column for pivotally and removably supporting the other end of the housing and in this general structure there is provided an improved mixer locking structure to prevent pivoting of the housing under heavy beater loads that comprises an apertured plate fixed to the column with a cut-out for leveling means operable through the cut-out to adjust the horizontal housing position, fixed hook means extend below the housing through the apertured plate and a lock slider is movable into the column parallel to the plate to engage the hook and lock the housing to the column. The slider is actuated from outside the column and has plural steps or equivalent for selective hook engagement in cooperation with a selected leveling position whereby the housing is locked to the column on an automatically selected slider position as determined by the leveling to prevent upward housing rotation under heavy beater loads.

7 Claims, 4 Drawing Figures

MIXER LOCKING STRUCTURE

FIELD OF THE INVENTION

The invention is directed to a heavy duty type household, stand food mixer with the motor-enclosed housing being pivotally mounted on an upright column on a standard base. Means is provided to automatically and adjustably lock the housing against rotation under heavy beater loads.

DESCRIPTION OF THE PRIOR ART

In the common household mixer field there are generally two types. The lightweight portable mixer is well known and is used for light whipping and mixing and numerous chores in the kitchen. It may be conveniently stored directly on the wall where it is ready for use. The second type mixer is the larger stand mixer that is a much heavier and rugged mixer and generally comprises a motor in an enclosed housing with a handle and removable beaters at one end exactly as a portable mixer. The heavy duty mixer is generally larger and is used with a bowl-supporting base having an upstanding column at one end for pivotally and removably supporting the mixer head or housing. The mixer head may be detached and used portably although it is generally too heavy for such comfortable use as compared to the light-weight portable mixers. The heavy duty stand mixer is designed for use with different-sized bowls on its base and generally has means to adjust the position of the mixer head relative to the base with a leveling screw so that the head may be adjusted for different-sized bowls to place the beaters in a bowl-driving position as is well known. Also it is known to lock the beater head to the column and in some older mixers this was done by a sliding connection whereby the mixer head could be removed by sliding it forward and upward to disengage from a channel connection and use it portably. On later mixers any suitable locking means may be used but a considerable amount of play is possible between the mixer head and stand permitting wearing of the parts. Additionally, stand mixers of late have come with heavy duty beaters better known as "dough hooks" which are used for kneading bread dough or the like and put a considerable load on the mixer resulting in a tendency to raise the mixer head on the stand. Consequently, pivoted heads, which are rotatable out of the bowls to change bowls, are subject to upward motion due to use of different sized bowls as well as the currently-used heavy dough hooks tending to ride the head upwardly as the dough is kneaded. Thus, a locking structure is desired that locks the head firmly on the column in a stand mixer while still permitting a leveling adjustment and automatically locking into a snug fit regardless of the position of the leveling adjustment.

SUMMARY OF THE INVENTION

Briefly described, the invention is directed to a household electric, stand food mixer which has a motor-enclosed horizontal housing that forms the mixer head with a handle and removable beaters extending downwardly at one end, a bowl-supporting base with a column for pivotally and removably supporting the other end of the housing or mixer head and to this general stand mixer there is provided an improved mixer locking structure comprising an apertured flat mounting plate fixed to the column top and having a cut-out with leveling means operable through the cut-out to vary the horizontal housing position. A fixed hook means extends below the housing through the apertured plate and a lock slider is movable into the column parallel to the mounting plate to engage the hook and lock the housing to the column. The slider preferably has plural steps that decrease in the direction of the slider-in position and the steps are for selective hook engagement to co-operate with a selected leveling position. Actuating means on the slider is provided external of the column so the housing is locked to the column on a selected slider step that, because of the decrease in the direction of the slider-in position, is automatically selected as determined by the leveling means to prevent upward housing rotation under heavy beater loads. Further, the slider may use a detent securing mechanism that is held in fixed position by a spring-biased member for engaging serrations on the slider to secure it in its selected position. Thus, the main object of the invention is to provide a mixer locking structure for a stand mixer which firmly and automatically locks the mixer head to the stand automatically in conjunction with a level selector to permit flexibility in the use of different-sized bowls as well as heavy beater loads.

DESCRIPTION OF THE PREFERRED EMBODIMENT

Figure 1:
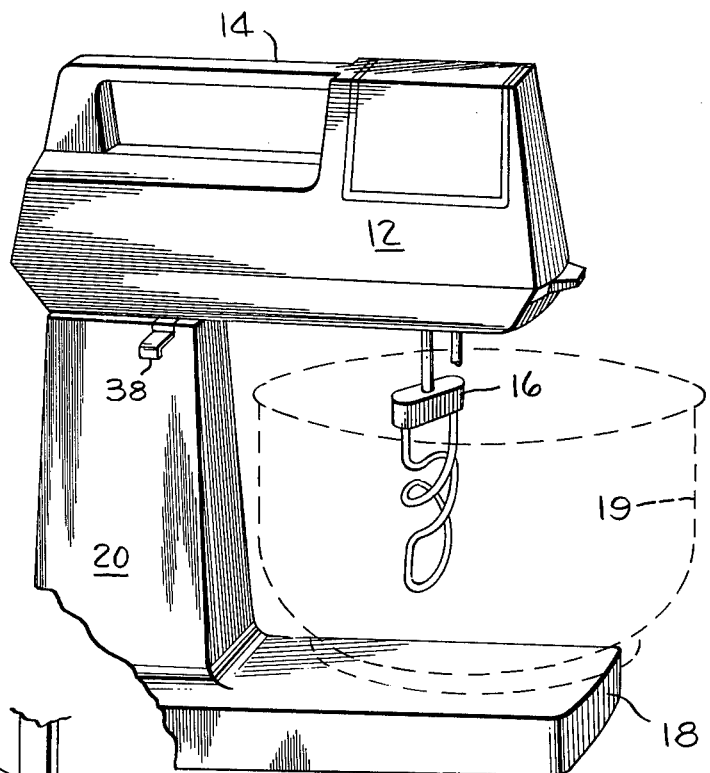
FIG. 1 is a partial perspective, with a bowl in phantom, of a stand mixer showing the actuator for the lock slider.

Referring to the drawings, there is shown in FIG. 1 a heavy duty type household electric, stand food mixer that has a generally horizontal head or housing 12 with a suitable handle 14 and containing a heavy duty motor not shown. For mixing, removable beaters extend downwardly at one end of the housing and, for heavy duty application, such beaters may comprise dough hooks 16 that may be substituted for the regular beaters and are used in kneading heavy dough and thus applying heavy loads to the mixer. The mixer is disposed on a bowl-supporting base 18 which carries column 20 at one side for pivotally and removably supporting the end of the mixer opposite the beaters in a well known manner, so that the mixer head may be tilted up and back to remove the beaters from the bowls and change bowls 19. Because of the different sized bowls that are used, and the desirability of driving the bowls with the beater action as is well known, a suitable leveling means 22, which may take the form of a rotatable threaded screw, is supplied between the head and column 20 vary the horizontal head or housing position by changing the angle slightly between the two. This permits adjustment of the head to bring the beaters to the edge of the bowl being used in order to rotate the bowl on the base and obtain better mixing. The function of the mixer lock to be described is to firmly fix the motor unit to the stand so that it will not lift when dough hooks are used. The dough hooks are designed so that during kneading operation, the hooks push the dough downwards so the motor head is lifted tending to separate the beaters from the dough making the entire mixer unit unstable on the countertop. To prevent this upward movement of the head and to prevent slack movement between the head and column about the pivot, it is desired to lock the two firmly together when the mixer is operating but to provide a lock that does not permit slack motion to cause wear on the parts and bouncing of the mixer. It is also desired to provide a lock that automatically seeks the correct position regardless of the previous setting of the leveling means that was used to adjust to a particular bowl.

Figure 4:
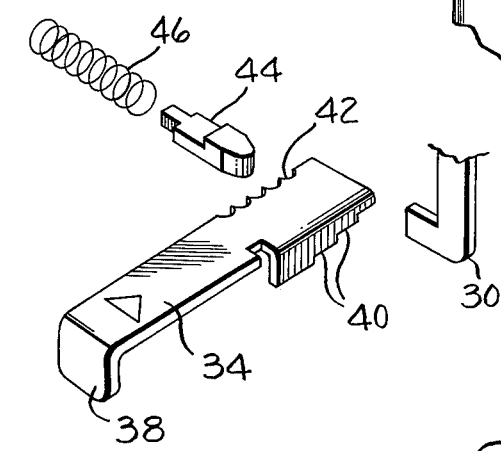
FIG. 4 is an exploded perspective of the lock slider detent structure showing the steps and hook.
Figure 2:
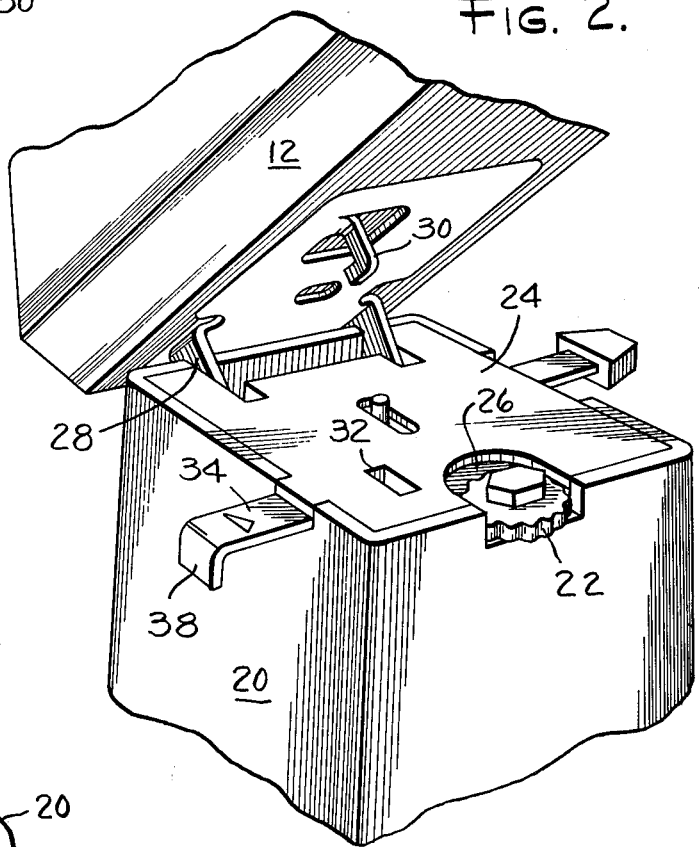
FIG. 2 is a partial perspective of the top of the column with a mixer head pivoted thereto.
Figure 3:
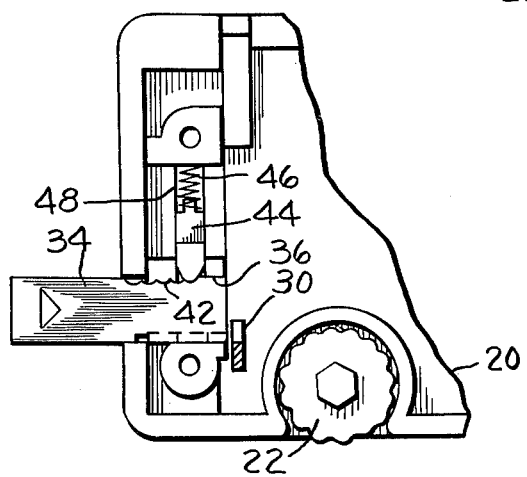
FIG. 3 is a partial plan view looking down on the column top as in FIG. 2 with the mounting plate removed.

To provide this action, as seen in FIG. 2, there is provided an apertured flat mounting plate 24 that is fixed to the top of column 20 by screws not shown, and which is provided with a cut-out 26 spanning the leveling means 22 and which is operable through the cut-out to bear against the bottom of head 12 and vary the angle between the two as appropriate for adjusting to the bowl. For securing the housing 12 and column 20 together, from the position shown in FIG. 2 where they are apart about pivot 28, to the closed locked position shown in FIG. 1, a suitable hook means 30 fixed to the housing extends below the housing and is oriented to pass through aperture 32 in plate 24. Of course, the amount that hook 30 extends through aperture 32 depends on the position of leveling means 22. For locking the housing 12 and column 20 together, means is provided in the form of a lock-slider 34 mounting for sliding movement into the column below and parallel to plate 24. It conveniently takes the form of flat bar that slides in a channel 36 in column 20. The slider is moved by suitable actuating means 38 that extends externally of the column. For locking, slider 34 overlaps hook 30, as seen in FIGS. 3 and 4, and prevents the hook from lifting away from column 20. Thus, as slider 34 is moved in and out the column it overlaps and locks hook 30 to prevent upward movement of the head.

One of the features of the invention is the automatic selection of the current snug locking position by slider 34 regardless of the position of leveling means 22 to always prevent any slack motion between head 12 and column 20. To ensure this, the slider has means to automatically select the correct locking position. While any suitable means, such as a taper, will suffice, the preferred form is a plurality of steps 40 (FIG. 4) that decrease in the direction of the slider in position, i.e. the steps decrease from four steps to one step from left to right in FIG. 4. Thus, regardless of the leveling position of means 22 changing the position of hook 30 relative to slide 34, the slide engages to lock the hook on one of the steps 40 so that the user may merely push the slide in and it cooperates to align itself on one of the steps 40 engaging hook 30 for a snug fit thus always providing automatic selection of the correct step for locking regardless of the position of leveling means 22. The result is a snug lock fit with substantially no slack for movement between head 12 and column 20 and also preventing any pivoting of the head.

To make sure the slider stays in the desired position during mixer use and is not vibrated out, it has a securing means in the form of a detent mechanism as seen in FIG. 4. Conveniently, this takes the form of providing serrations 42 on one side of the flat bar slider 34 which cooperate with a suitably pointed member 44 that is biased by spring 46 so the member engages the serrations securing the slider in its selected position. The slider thus moves with an audible click as member 44 rides across serrations 42 on slider movement. The detent mechanism lies in a groove 48 in the column and is held in position by mounting plate 24.

Thus, in a stand food mixer adapted for heavy duty use, I have provided a mixer locking structure that locks the head and stand together and cooperates with a leveling means by a unique stepped lock slider that automatically, on actuation, locks to the correct step for snugly locking the housing to the column. This avoids wear on the parts, prevents riding of the mixer under heavy loads, and uses the same structure in the leveling means already present.

While there has been described a preferred form of the invention, obvious equivalent variations are possible in light of the above teachings. It is therefore to be understood that, within the scope of the appended claims, the invention may be practiced otherwise than as specifically described, and the claims are intended to cover such equivalent variations.

I claim:

1. A household electric, stand food mixer having a motor-enclosed horizontal housing with a handle and removable beaters extending downwardly at one end, a bowl-supporting base with a column for pivotally and removably supporting the other end of said housing, an improved mixer locking structure comprising, an apertured flat mounting plate fixed to the column top and having a cut-out;

leveling means operable through the cut-out to vary the horizontal housing position;

fixed hook means extending below the housing through said apertured plate;

a lock slider movable into the column parallel to said plate to engage the hook and lock the housing to the column;

said slider having means for selective hook engagement position cooperating with a selected leveling position; and actuating means on said slider external of said column;

whereby the housing is locked to the column on a selected slider position as determined by the leveling means to prevent upward housing rotation under heavy beater loads.

2. Apparatus as described in claim 1 wherein the slider means for selective hook engagement position comprise plural steps so the housing is locked to the column on a selected slider step determined as described in said claim 1.

3. Apparatus as described in claim 2 wherein said slider is mounted for movement parallel to said plate, and means securing said slider against movement when in the selected hook-engaging position.

4. Apparatus as described in claim 3 wherein the steps on said slider decrease in the direction of the slider-in-position for automatic selection of the step for locking the housing to the column.

5. Apparatus as described in claim 4 wherein said slider-securing means is a detent mechanism.

6. Apparatus as described in claim 4 wherein said slider is a flat bar with serrations along one side, and a spring-biased member engaging said serrations to secure the slider in its selected position.

7. Apparatus as described in claim 6 wherein the leveling means is a rotatable threaded screw bearing against said housing and column to adjust the angle therebetween.

* * * * *